United States Patent
Watanabe (10) Patent No.: US 8,633,447 B2
(45) Date of Patent: Jan. 21, 2014

(54) RADIATION IMAGE DETECTING DEVICE AND METHOD FOR DETECTING START OF IRRADIATION

(75) Inventor: Keita Watanabe, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 171 days.

(21) Appl. No.: 13/361,386

(22) Filed: Jan. 30, 2012

(65) Prior Publication Data

US 2012/0199751 A1 Aug. 9, 2012

(30) Foreign Application Priority Data

Feb. 9, 2011 (JP) ................................. 2011-025850

(51) Int. Cl.
G01T 1/24 (2006.01)
(52) U.S. Cl.
USPC ...................................... 250/370.09; 250/371
(58) Field of Classification Search
USPC ................................................... 250/370.09
See application file for complete search history.

(56) References Cited

U.S. PATENT DOCUMENTS

| | | | |
|---|---|---|---|
| 6,404,854 B1 * | 6/2002 | Carroll et al. ................. | 378/98.8 |
| 6,797,960 B1 | 9/2004 | Spartiotis et al. | |
| 6,801,598 B2 | 10/2004 | Tashiro et al. | |
| 8,045,680 B2 | 10/2011 | Taoka et al. | |
| 2002/0101527 A1 * | 8/2002 | Endo ............................. | 348/302 |
| 2005/0279943 A1 * | 12/2005 | Kobayashi et al. ...... | 250/370.09 |
| 2009/0194672 A1 * | 8/2009 | Tredwell et al. ........... | 250/208.1 |

* cited by examiner

Primary Examiner — Marcus Taningco
(74) Attorney, Agent, or Firm — Sughrue Mion, PLLC (57) ABSTRACT

An FPD has plural pixels arranged in two dimensions. The pixels include a short pixel directly connected to a signal line, and a comparative pixel connected to another signal line through a TFT. In irradiation detecting operation, a control section monitors a voltage signal from the short pixel. When the voltage signal is a predetermined threshold value or more, the control section detects the start of X-ray irradiation, and provisionally starts charge accumulation operation. Then, the control section calculates the difference in the voltage signal between the short pixel and the comparative pixel. When this difference is another threshold value or more, the detection of the start of X-ray irradiation is judged to be valid. When the difference is less than the threshold value, the detection is judged to be misdetection caused by shock noise. The charge accumulation operation is aborted, and the irradiation detecting operation is restarted.

11 Claims, 7 Drawing Sheets

RADIATION IMAGE DETECTING DEVICE AND METHOD FOR DETECTING START OF IRRADIATION

BACKGROUND OF THE INVENTION

1. Field of the Invention

The present invention relates to a radiation image detecting device for detecting a radiographic image of a sample, and a method for detecting the start of irradiation with radiation.

2. Description Related to the Prior Art

In a medical field, an X-ray imaging system using X-rays is known as a type of radiation imaging systems. The X-ray imaging system is constituted of an X-ray source for generating the X-rays, and an X-ray image detecting device that receives the X-rays having passed through a sample and detects an X-ray image of the sample. A type of the X-ray image detecting devices that has a flat panel detector (FPD) is in practical use. The FPD includes a TFT (thin film transistor) active matrix substrate having plural pixels arranged in two dimensions, and each pixel accumulates signal charge by an amount corresponding to the amount of the X-rays incident thereon. The FPD detects the X-ray image, which represents image information of the sample, by accumulating the signal charge on a pixel-by-pixel basis, and outputs the X-ray image as digital image data.

The X-ray image detecting device using the FPD, in contrast to the other types of X-ray image detecting devices using a film or an imaging plate (IP), needs to be synchronized with the X-ray source, such that the FPD accumulates the signal charge concurrently with emission of the X-rays from the X-ray source. Accordingly, a controller e.g. a console of the X-ray image detecting device synchronizes the start of charge accumulation operation by the FPD with the start of X-ray emission by the X-ray source, which is triggered by a push of an emission switch connected to the X-ray source. Specifically speaking, the controller receives an emission start signal issued from the emission switch, and outputs this signal as a synchronization signal to the X-ray image detecting device. Upon receiving the synchronization signal, the X-ray image detecting device shifts to the charge accumulation operation, and starts capturing the X-ray image.

However, when the X-ray image detecting device and the X-ray source are manufactured by different makers, the X-ray image detecting device and its controller are sometimes outfitted with a synchronization control interface incompatible with that of the X-ray source (as to specifications of a cable and a connector, the format of the synchronization signal, and the like). Therefore, various self-detection techniques are proposed in which the X-ray image detecting device detects the start of X-ray irradiation by itself without using the synchronization signal, for synchronization with the X-ray source (refer to U.S. Pat. No. 6,801,598 corresponding to Japanese Patent Laid-Open Publication No. 2003-126072, U.S. Pat. No. 6,797,960 corresponding to Japanese Unexamined Patent Application Publication No. 2002-543684, and U.S. Pat. No. 8,045,680 corresponding to Japanese Patent Laid-Open Publication No. 2008-125903).

According to the self-detection techniques disclosed in the above patent documents, however, when noise (hereinafter called shock noise) caused by shock, vibration or the like occurs, the X-ray image detecting device could wrongly detect the shock noise as the start of X-ray irradiation, and shift to the charge accumulation operation. In spite of this fact, the above patent documents do not describe or even suggest an object of preventing the misdetection caused by the shock noise and measures against it.

SUMMARY OF THE INVENTION

An object of the present invention is to provide a radiation image detecting device that detects the start of radiation irradiation by itself and prevents misdetection caused by shock noise.

To achieve the above and other objects of the present invention, a radiation image detecting device according to the present invention includes a plurality of pixels arranged in two dimensions along row and column directions in an imaging area, a plurality of scan lines, a plurality of signal lines, a drive section, and a control section. Each pixel generates signal charge in accordance with an amount of radiation incident on the pixel. The pixels include at least one short pixel without having a switching element for readout control of the signal charge and normal pixels having the switching element. The scan lines extend in the row direction. A gate electrode of the switching element of every normal pixel is connected to the scan line of the corresponding row. The signal lines extend in the column direction. Every normal pixel is connected to the signal line of the corresponding column through a medium of the switching element, while the short pixel is directly connected to the signal line of the corresponding column. The drive section selects one of the scan lines, and puts the normal pixels connected to the selected scan line into charge accumulation operation and readout operation. In the charge accumulation operation, the switching element is turned off to accumulate the signal charge generated in the normal pixel. In the readout operation, the switching element is turned on to discharge the accumulated signal charge through the corresponding signal line. The control section judges a start of radiation irradiation and controls the drive section. The start of radiation irradiation is judged by a difference between first and second output values. The first output value is outputted from a first signal line connected to the short pixel out of the signal lines, and the second output value is outputted from a second signal line connected to the normal pixel.

The control section preferably compares the difference between the first and second output values with a predetermined threshold value, and starts the charge accumulation operation through the drive section when the difference is equal to or more than the threshold value.

The control section preferably makes a first judgment by which the start of radiation irradiation is detected based on the first output value, and provisionally starts the charge accumulation operation through the drive section. After that, the control section makes a second judgment by which a validity of the first judgment is judged based on the difference between the first and second output values in order to determine whether the charge accumulation operation is aborted or continued.

The radiation image detecting device may further include a first integration amplifier connected to the first signal line and a second integration amplifier connected to the second signal line. The first integration amplifier outputs a voltage corresponding to an integrated value of the signal charge generated in the short pixel as the first output value. The second integration amplifier outputs a voltage corresponding to an integrated value of the signal charge accumulated in the normal pixel as the second output value.

After the charge accumulation operation is started, the first and second integration amplifiers may be reset repeatedly at predetermined intervals, and the second judgment is carried out in a period between first reset and second reset.

While the start of radiation irradiation is detected, the control section may turn on all the switching elements in the single row.

The short pixel is preferably situated in a middle of the imaging area. The short pixels are preferably situated in various positions in the imaging area.

The radiation image detecting device may further include a correction section for correcting a pixel value of the short pixel and pixel values from the column having the short pixel contained in the obtained radiographic image.

A method for detecting the start of radiation irradiation includes the steps of subtracting the second output value outputted from a comparative pixel being one of the normal pixels from the first output value outputted from the short pixel; and judging that the radiation irradiation is started when the difference between the first and second output values is equal to or more than a predetermined value.

The comparative pixel is preferably adjoining to the short pixel.

According to the present invention, it is possible to detect the start of radiation irradiation by itself with preventing the misdetection caused by the shock noise.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

First Embodiment

Figure 1:
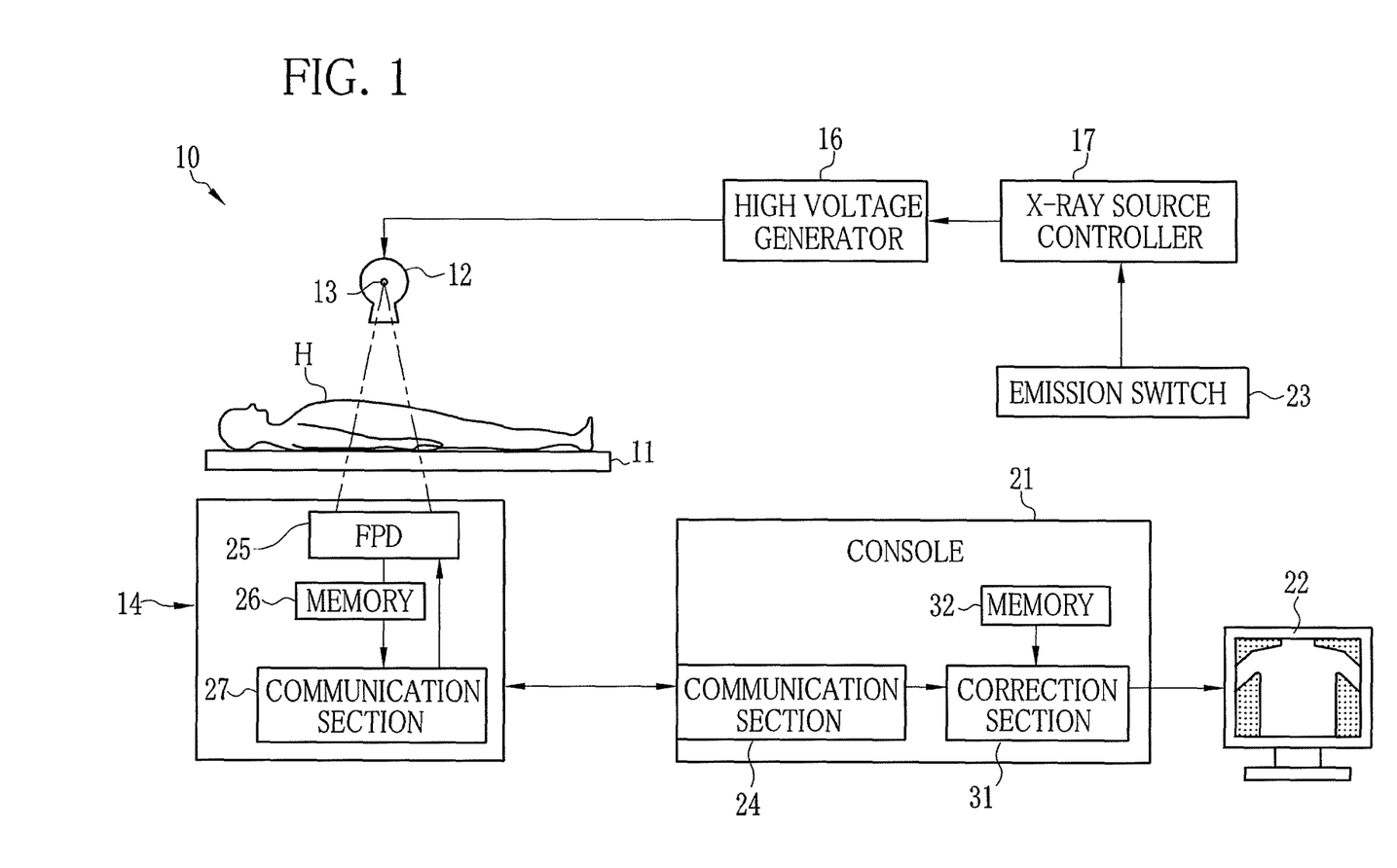
FIG. 1 is a schematic view of an X-ray imaging system.

As shown in FIG. 1, an X-ray imaging system 10 is constituted of an imaging table 11, an X-ray source 12, and an electronic cassette (radiation image detecting device) 14. A patient H lies down on the imaging table 11. The X-ray source 12 applies X-rays from an X-ray focus 13 to the patient's body part to be imaged. The electronic cassette 14 captures an X-ray image. The X-ray source 12 has an X-ray tube for generating the X-rays and a collimator for limiting an irradiation field of the X-rays.

The X-ray imaging system 10 includes a high voltage generator 16, an X-ray source controller 17, a console 21, and a monitor 22. To the X-ray source controller 17, imaging conditions including tube voltage, tube current, emission time, and the like are inputted from an operation panel (not shown) or the like. The inputted imaging conditions are sent from the X-ray source controller 17 to the high voltage generator 16. To the X-ray source controller 17, an emission switch 23 used for entering an emission start signal is connected. The X-ray source controller 17 supplies the emission start signal entered from the emission switch 23 to the X-ray source 12 through the high voltage generator 16.

The high voltage generator 16 generates the tube voltage and the tube current in accordance with the imaging conditions inputted from the X-ray source controller 17, and supplies the generated tube voltage and tube current to the X-ray source 12. In response to the emission start signal, the X-ray source 12 starts emitting the X-rays with the supplied tube voltage and tube current. After a lapse of predetermined emission time, the X-ray source 12 stops emitting the X-rays.

The console 21 is a controller of the electronic cassette 14. The emission start signal from the emission switch 23 is not inputted to the console 21. The console 21 sends a control signal to the electronic cassette 14 via a communication section 24, and receives the X-ray image captured by the electronic cassette 14. The monitor 22 displays an operation screen used for operation of the console 21, in addition to the X-ray image received from the console 21.

The console 21 has a correction section 31. The correction section 31 applies various correction processes to the X-ray image captured by the electronic cassette 14, and outputs the corrected image to the monitor 22. For example, the correction section 31 applies to the X-ray image a defect correction process for correcting a pixel value of a defective pixel by interpolation, a noise removal process for removing noise due to dark charge by subtracting offset image data from captured X-ray image data. The offset image data and defective pixel data is stored in advance on a memory 32. Note that, a gain correction process for adjusting an output value of each pixel is carried out by a signal processing section of the electronic cassette 14, as described later.

The electronic cassette 14 is composed of an FPD 25 for detecting the X-ray image, a memory 26 for temporarily storing the X-ray image detected by the FPD 25, a communication section 27 for making communication with the console 21 to send data stored in the memory and receive the control signal, and a flat rectangular parallelepiped case containing all above components. The communication section 27 makes radio communication by infrared light or a radio wave, for example. The electronic cassette 14 is of a wireless type that contains a battery (not shown) to power its components including the FPD 25. Alternatively, the communication sections 24 and 27 may make wired communication through a cable, and/or the electronic cassette 14 may be energized by utility power, instead of the battery, through a power cable.

Figure 2:
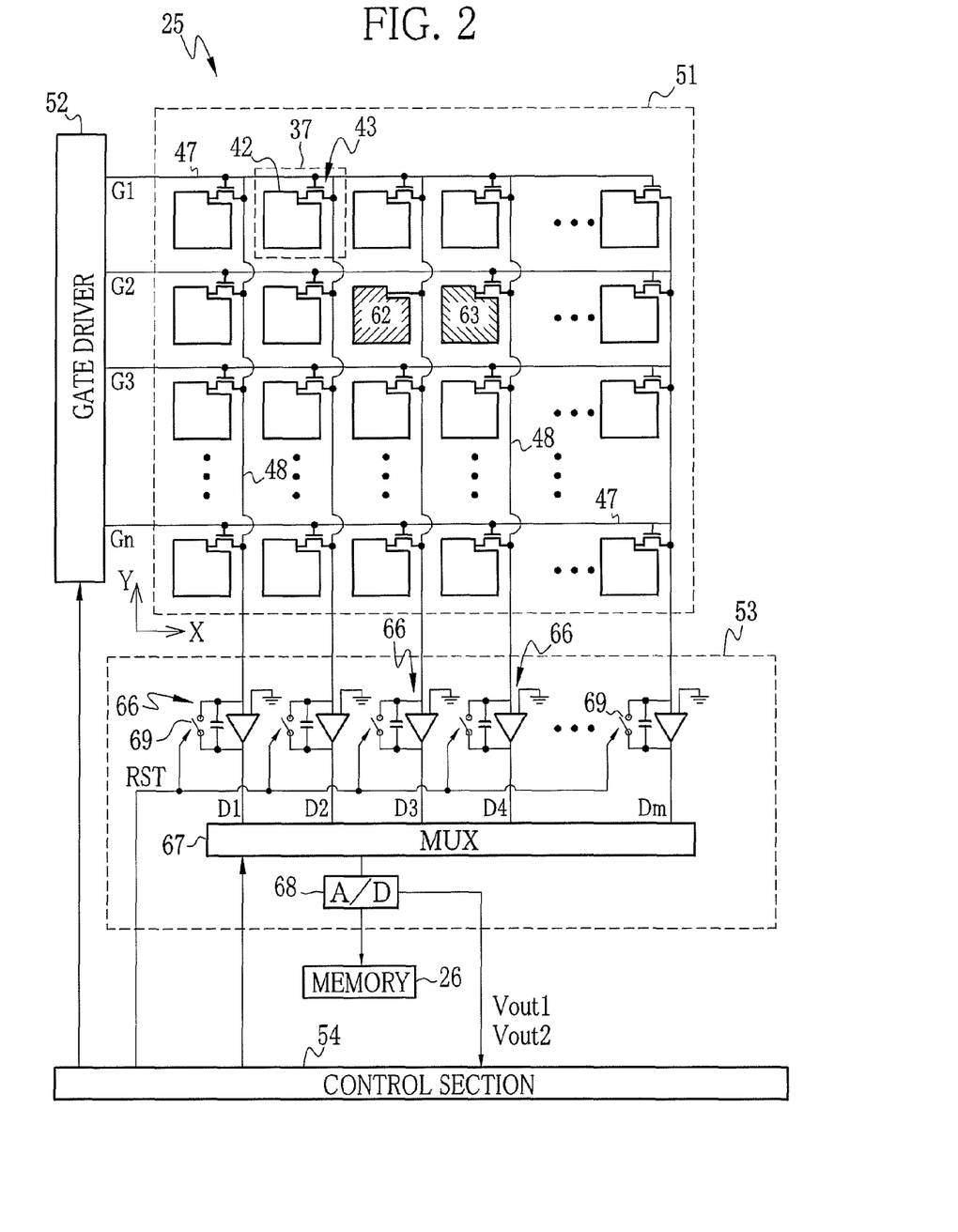
FIG. 2 is a schematic circuit diagram of an FPD.

As shown in FIG. 2, the FPD 25 includes an imaging panel, a gate driver 52, a signal processing section 53, and a control section 54. In the imaging panel, an imaging area 51, which has plural pixels 37 arranged on a TFT active matrix substrate, is formed. Each pixel 37 accumulates signal charge by an amount corresponding to the amount of the X-rays incident thereon. The gate driver 52 drives the pixels 37, and controls readout of the signal charge. The signal processing section 53 converts the signal charge read out from the pixels 37 into digital data, and outputs the digital data. The control section 54 controls the gate driver 52 and the signal processing section 53, and controls the operation of the FPD 25. The pixels 37 are arranged at a predetermined pitch in two dimensions into a matrix with n rows (X direction) and m columns (Y direction).

The FPD 25, being of an indirect conversion type, has a scintillator (phosphor) for converting the X-rays into visible light. The pixels 37 apply photoelectric conversion to the visible light converted by the scintillator. The scintillator is disposed so as to face the whole surface of the imaging area 51 having the matrix of the pixels 37.

The pixel 37 includes a photodiode 42 and a capacitor. The photodiode 42, being a photoelectric conversion element, produces electric charge upon entry of the visible light. The capacitor accumulates the electric charge produced by the photodiode 42. The pixel 37 also includes a thin film transistor (TFT) 43 as a switching element.

The photodiode 42, being a PIN photodiode, for example, has a semiconducting layer for generating the electric charge (negative-electron and positive-hole pairs) and upper and lower electrodes disposed on the top and bottom of the semiconducting layer. The TFT 43 is connected to the lower electrode of the photodiode 42. To the upper electrode, a bias line (not shown) is connected, to apply bias voltage to the upper electrode. Since the application of the bias voltage produces an electric field in the semiconducting layer, the electric charge i.e. the negative-electrons and the positive-holes generated in the semiconducting layer by the photoelectric conversion are attracted to the upper and lower electrodes with positive and negative polarity, respectively. Thereby, the electric charge is accumulated in the capacitor.

A gate electrode of the TFT 43 is connected to a scan line 47. A source electrode of the TFT 43 is connected to the photodiode 42, and a drain electrode is connected to a signal line 48. The scan lines 47 and the signal lines 48 are routed into a lattice. The number of the scan lines 47 coincides with the number of the rows of the pixels 37 arranged in the imaging area 51, and is "n" in this embodiment. The number of the signal lines 48 coincides with the number of the columns of the pixels 37, and is "m" in this embodiment. The scan lines 47 are connected to the gate driver 52, and the signal lines 48 are connected to the signal processing section 53.

The gate driver 52 drives the TFTs 43 so as to implement three types of operation, including charge accumulation operation in which each pixel 37 accumulates the signal charge by an amount corresponding to the amount of the X-rays incident thereon, readout operation in which the signal charge is readout from each pixel 37, and pixel reset operation. In the semiconducting layer of the photodiode 42, the dark charge always occurs irrespective of the presence or absence of entry of the X-rays. Since the bias voltage is applied to the semiconducting layer, the dark charge accumulates in the capacitor. In the pixel reset operation, the dark charge occurring in each pixel 37 is discharged through the signal line 48 to reset the pixel 37. The control section 54 controls the start timing of the pixel reset operation, the charge accumulation operation, and the readout operation, which are carried out by the gate driver 52 based on the control signal inputted from the console 21 through the communication section 27.

In the charge accumulation operation, while the TFT 43 is turned off, the pixel 37 accumulates the signal charge. Concurrently with the start of the charge accumulation operation, the control section 54 actuates a timer to start measuring a charge accumulation time. The charge accumulation time is set longer than the maximum emission time of the X-ray source 12, so the charge accumulation time continues throughout irradiation with the X-rays. In the readout operation, the gate driver 52 successively generates gate pulses G1 to Gn, being drive pulses. In response to the gate pulses G1 to Gn, the scan lines 47 are activated from line to line, and the TFTs 43 connected to the activated scan line 47 are turned on. When the TFT 43 is turned on, the electric charge accumulated in the capacitor of the pixel 37 is read out to the signal line 48, and inputted to the signal processing section 53.

The signal processing section 53 includes integration amplifiers 66, a multiplexer (MUX) 67, and an A/D converter (A/D) 68. The amplifier 66 is connected to each and every signal line 48 on a one-by-one basis. The integration amplifier 66 is composed of an operational amplifier and a capacitor. The capacitor is connected between input and output terminals of the operational amplifier. One of the input terminals of the operational amplifier is connected to the signal line 48. The other input terminal is connected to a ground (GND). The integration amplifiers 66 convert the electric charge inputted from the signal lines 48 into voltage signals D1 to Dm by integration, and output the voltage signals D1 to Dm. The output terminal of every integration amplifier 66 is connected to the MUX 67. An output of the MUX 67 is connected to the A/D 68.

The MUX 67 successively selects one of the plural integration amplifiers 66 connected in parallel, and inputs the voltage signals D1 to Dm in series in selecting order to the A/D 68. The A/D 68 converts the inputted voltage signals D1 to Dm into digital data, and outputs the digital data to the memory 26 contained in the case of the electronic cassette 14.

After the MUX 67 reads out the voltage signals D1 to Dm of the single row from the integration amplifiers 66, the control section 54 inputs a reset pulse (reset signal) RST to the integration amplifiers 66. In response to the reset pulse RST, a reset switch 69 of every integration amplifier 66 is turned on to reset the signal charge accumulated therein. Taking a case where the signal charge is read out from the pixels 37 of a first row connected to the scan line G1 to the integration amplifiers 66, for example, the signal charge of the first row is reset in the integration amplifiers 66. Subsequently, the control section 54 commands the gate driver 52 to output the gate pulse G2 for a second row, so the signal charge is read out from the pixels 37 of the second row. The readout operation of the second or later rows is carried out in a like manner as that of the first row.

When the readout operation of every row is completed, image data representing a single frame of the X-ray image is recorded to the memory 26. Then, the image data is readout from the memory 26, and outputted to the console 21 through the communication section 27. Thereby, the X-ray image of the sample is detected.

The dark charge occurring in the pixels 37 causes offset noise of the pixel data. Accordingly, the pixel reset operation is performed at the beginning of the charge accumulation operation. The pixel reset operation adopts a sequential reset method, for example, in which the pixels 37 are successively reset from row to row.

In the sequential reset method, as in the case of the readout operation of the signal charge, the gate driver 52 successively issues the gate pulses G1 to Gn to the scan lines 47 to turn on the TFTs 43 of the pixels 37 from row to row. While the TFTs 43 are turned on, the dark charge flows from the pixels 37 to the integration amplifiers 66 through the signal lines 48. In the pixel reset operation, not as in the case of the readout operation, the MUX 67 does not read the signal charge accumulated in the integration amplifiers 66. The control section 54 outputs the reset pulse RST in synchronization with issue of each gate pulse G1 to Gn, and resets the integration amplifiers 66.

Furthermore, the electronic cassette 14 performs irradiation detecting operation in which the electronic cassette 14 detects the start of X-ray irradiation by itself. During the irradiation detecting operation, the above pixel reset operation is repeatedly carried out. The irradiation detecting operation is started, when the imaging conditions are inputted from the console 21 to the control section 54. When the start of X-ray irradiation is detected, the electronic cassette 14 shifts to the charge accumulation operation.

The FPD 25 has a short pixel 62 that is directly connected to the signal line 48 without the medium of the TFT 43, and a comparative pixel 63 that is chosen from the pixels 37 connected to the signal lines 48 through the medium of the TFTs 43. The comparative pixel 63 is used for comparing its pixel value with that of the short pixel 62. The short pixel 62 and the comparative pixel 63 are positioned in the vicinity to each other, and more specifically, in adjoining columns of the same row.

The short pixel 62 has the same structure as the other pixels 37 except that the TFT 43 is not provided before the signal line 48. Because of this structure, the signal charge generated in the short pixel 62 immediately flows into the signal line 48. This occurs even during a period when the TFTs 43 of the pixels 37 in the same row are turned off and the pixels 37 accumulate the signal charge. The voltage signal (D3 in FIG. 2) outputted from the integration amplifier 66 in the signal line 48 connected to the short pixel 62 is inputted as a voltage signal Vout1 to the control section 54 through the A/D 68, irrespective of an operation state of the electronic cassette 14.

The comparative pixel 63 is used together with the short pixel 62 as a pixel for detecting the start of X-ray irradiation. The comparative pixel 63 has the same structure as the other pixels 37. Specifically speaking, the signal charge generated in the comparative pixel 63 is accumulated when the TFT 43 is turned off, while is read out to the signal line 48 when the TFT 43 is turned on. The TFT 43 of the comparative pixel 63 is turned on or off, together with the TFTs 43 of the other pixels 37 in the same row, in response to the gate pulse G1 to Gn (G2 in FIG. 2) inputted to the scan line 47. The voltage signal (D4 in FIG. 2) outputted from the integration amplifier 66 in the signal line 48 connected to the comparative pixel 63 is inputted as a voltage signal Vout2 to the control section 54 through the A/D 68, irrespective of the operation state of the electronic cassette 14.

The control section 54 detects the start of X-ray irradiation based on the voltage signals Vout1 and Vout2 that are inputted from the integration amplifiers 66 in the signal lines 48 connected to the short pixel 62 and the comparative pixel 63, respectively. After the start of X-ray irradiation is detected, the control section 54 also judges the validity of the detection, in other words, whether the detection is actually caused by the X-ray irradiation or caused by shock noise.

The validity of the detection is judged as follows. When the irradiation detecting operation is started, the control section 54 monitors the voltage signal Vout1, and compares the voltage signal Vout1 with a predetermined threshold value TH1. If the voltage signal Vout1 is equal to or more than the threshold value TH1, the start of X-ray irradiation is detected.

After the detection, the control section 54 calculates the difference Δ between the voltage signals Vout1 and Vout2, and compares the difference Δ with a predetermined threshold value TH2 for a certain period of time. If the detection is caused by the shock noise, the difference Δ is always less than the threshold value TH2, as the details will be described later. On the other hand, if the detection is actually caused by the X-ray irradiation, the difference Δ is equal to or more than the threshold value TH2. Thus, the control section 54 judges that the detection is valid when the difference Δ between the voltage signals Vout1 and Vout2 is equal to or more than the threshold value TH2, while judges that the detection is invalid when difference Δ is less than the threshold value TH2 for the certain period of time.

Upon the detection of the start of X-ray irradiation, the control section 54 commands the FPD 25 to shift from the irradiation detecting operation to the charge accumulation operation. After that, if the detection is judged to be valid, the charge accumulation operation is continued. If the detection is judged to be invalid, on the other hand, all the TFTs 43 are turned on, and the irradiation detecting operation is restarted.

Next, the operation of the above embodiment will be described. In taking the X-ray image using the X-ray source 12 and the electronic cassette 14, the imaging conditions are set up separately in each of the X-ray source controller 17 and the electronic cassette 14. The imaging conditions include the tube voltage for determining an energy spectrum of the X-rays emitted from the X-ray source 12, the tube current for determining the amount of X-ray irradiation per unit of time, and the emission time of the X-rays. The imaging conditions depend on a body part to be imaged, an age of the patient H, and the like.

The imaging conditions are set up in the electronic cassette 14 through the console 21. The electronic cassette 14 sets up a gain of the integration amplifiers 66 and the like in accordance with the set imaging conditions. A plurality of imaging menus having the different imaging conditions are prepared in the console 21, and the imaging menus are displayed on an operation screen in a selectable manner. When one of the imaging menus is selected in the operation screen, the imaging conditions corresponding to the selected imaging menu are set up in the electronic cassette 14. When the imaging conditions are inputted from the console 21, the control section 54 receives the input as a preparation start command. In response to the preparation start command, the control section 54 starts the irradiation detecting operation.

When the electronic cassette 14 is actuated, the FPD 25 shifts to a mode of waiting for the input of the preparation start command. In the waiting mode, the gate driver 52 and the signal processing section 53 stand ready to operate by a command from the control section 54. In the waiting mode, for example, the pixel reset operation by the sequential reset method is repeatedly carried out. In the waiting mode, the irradiation detecting operation is not started yet. Accordingly, the control section 54 does not detect the start of X-ray irradiation, even if the voltage signal Vout1 exceeds the threshold value TH1 due to the shock noise or the like.

When the imaging menu is selected in the console 21, the imaging conditions are inputted to the electronic cassette 14. The control section 54 receives the input of the imaging conditions as the input of the preparation start command, and starts the irradiation detecting operation. Then, the control section 54 starts monitoring the voltage signal Vout1 inputted from the integration amplifier 66 in the signal line 48 connected to the short pixel 62.

Figure 3:
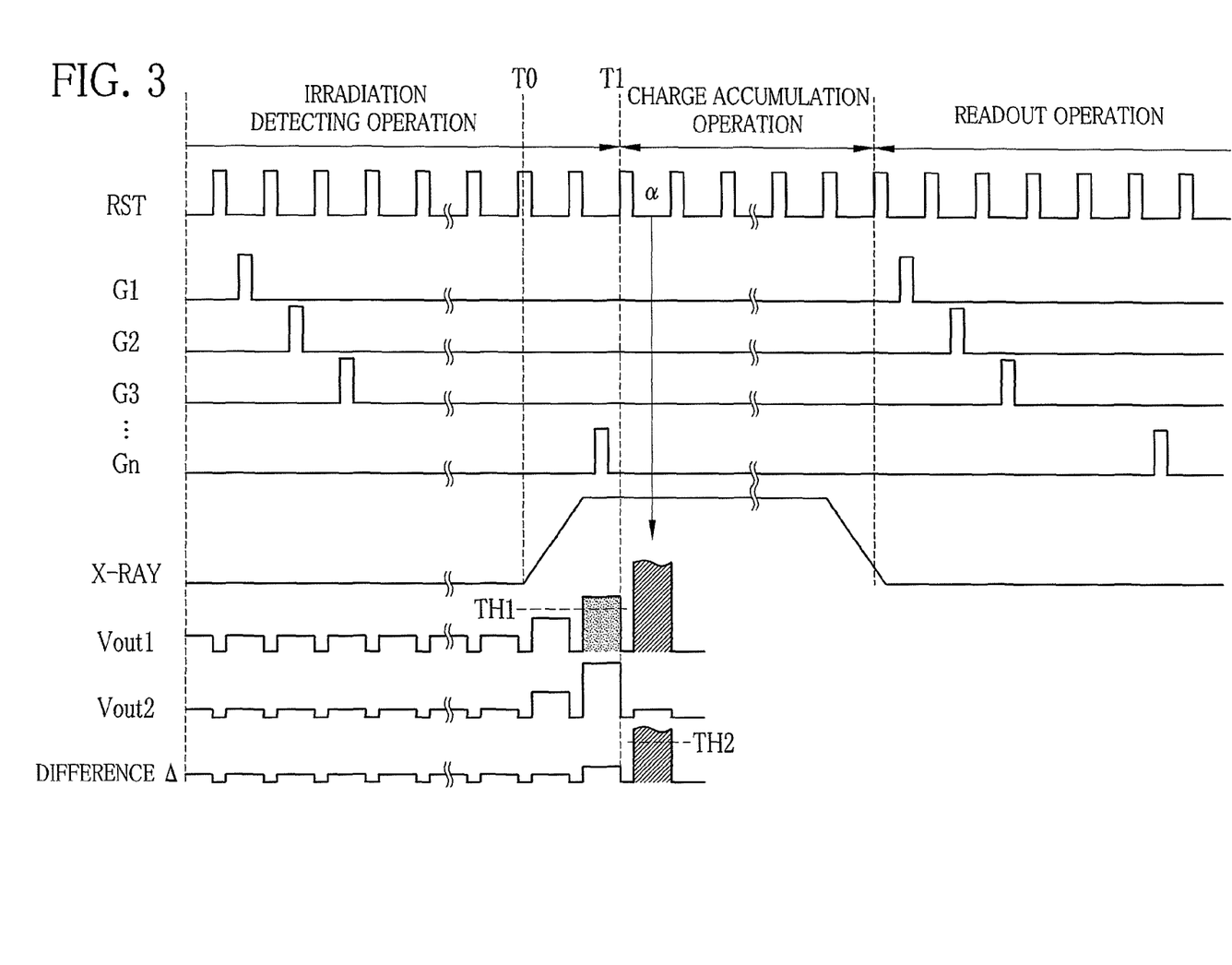
FIG. 3 is a timing chart during X-ray imaging operation.

As shown in FIG. 3, the voltage signal Vout1 represents a value of noise (hereinafter called dark charge noise) caused by the dark charge, during a period from the start of the irradiation detecting operation before the detection of the start of X-ray irradiation. The threshold value TH1, which the control section 54 compares with the voltage signal Vout1 to detect the start of X-ray irradiation, is set larger than the dark charge noise. Therefore, the control section 54 does not detect the start of X-ray irradiation in this period, except in the case of the occurrence of the shock noise or the like. The voltage signal Vout2 represents approximately the same variation as that of the voltage signal Vout1, but contains less noise than the voltage signal Vout1 because of the absence of the short pixel 62, which always outputs a signal caused by the dark charge. Thus, the voltage signal Vout2 represents a half value of the voltage signal Vout1.

When the emission switch 23 is pushed at a time T0, and the X-ray source 12 starts emitting the X-rays, the voltage signal Vout1 exceeds a noise level V0, because the signal charge generated in the short pixel 62 flows into the integration amplifier 66. The control section 54 compares the voltage signal Vout1 with the threshold value TH1, and detects a time T1 when the voltage signal Vout1 comes to be equal to or more than the threshold value TH1 for the first time, as a time of the start of X-ray irradiation. When the start of X-ray irradiation is detected, the control section 54 controls the gate driver 52 to turn off the TFTs 43 of all the pixels 37. Accordingly, the charge accumulation operation is started. At this time, since the TFT 43 of the comparative pixel 63 is also turned off, no electric charge flows into the integration amplifier 66 connected to the comparative pixel 63. Thus, the voltage signal Vout2 becomes zero concurrently with the shift to the charge accumulation operation, if no shock noise arises.

When the charge accumulation operation is started after the detection of the start of X-ray irradiation, the control section 54 judges the validity of the detection, in other words, whether the detection is actually caused by the X-ray irradiation or caused by the shock noise, as follows. During the irradiation detecting operation and the charge accumulation operation, the reset pulse RST is inputted at a constant frequency to every integration amplifier 66. The control section 54 compares the difference $\Delta(=\text{Vout1}-\text{Vout2})$ between the inputted voltage signals Vout1 and Vout2 with the threshold value TH2 in a period $\alpha$ between first and second reset pulses RST after the shift to the charge accumulation operation (after T1).

If the detection of the start of X-ray irradiation is valid, as shown in FIG. 3, the voltage signal Vout1 represents a value corresponding to the signal charge generated in the short pixel 62 by the X-ray irradiation (and the occurrence of the dark charge). On the other hand, the voltage signal Vout2 becomes zero as soon as the electronic cassette 14 shifts to the charge accumulation operation. This is because the TFT 43 of the comparative pixel 63 is turned off concurrently with the shift to the charge accumulation operation, and the signal charge (including the dark charge) generated in the comparative pixel 63 does not flow into the integration amplifier 66. Therefore, if the detection of the start of X-ray irradiation is valid, the difference $\Delta$ between the voltage signals Vout1 and Vout2 is substantially equal to the voltage signal Vout1 in the period $\alpha$.

The threshold value TH2 is set at such a value that the difference $\Delta$ comes to be equal to or more than the threshold value TH2 when the FPD 25 is irradiated with the X-rays. For example, the threshold value TH2 is set larger than the threshold value TH1. In this embodiment, the difference $\Delta$ exceeds the threshold value TH2 in the period $\alpha$. If the difference $\Delta$ is equal to or more than the threshold value TH2, the control section 54 judges that the detection of the start of X-ray irradiation is valid.

When the start of X-ray irradiation detected at the time T1 is verified based on a judgment result, the control section 54 puts the FPD 25 into the charge accumulation operation for a predetermined time measured from the time T1 in accordance with the imaging conditions, and then into the readout operation.

On the other hand, when the electronic cassette 14 gets the shock, vibration, or the like, and the shock noise occurs therein, the electronic cassette 14 operates as follows.

Figure 4:
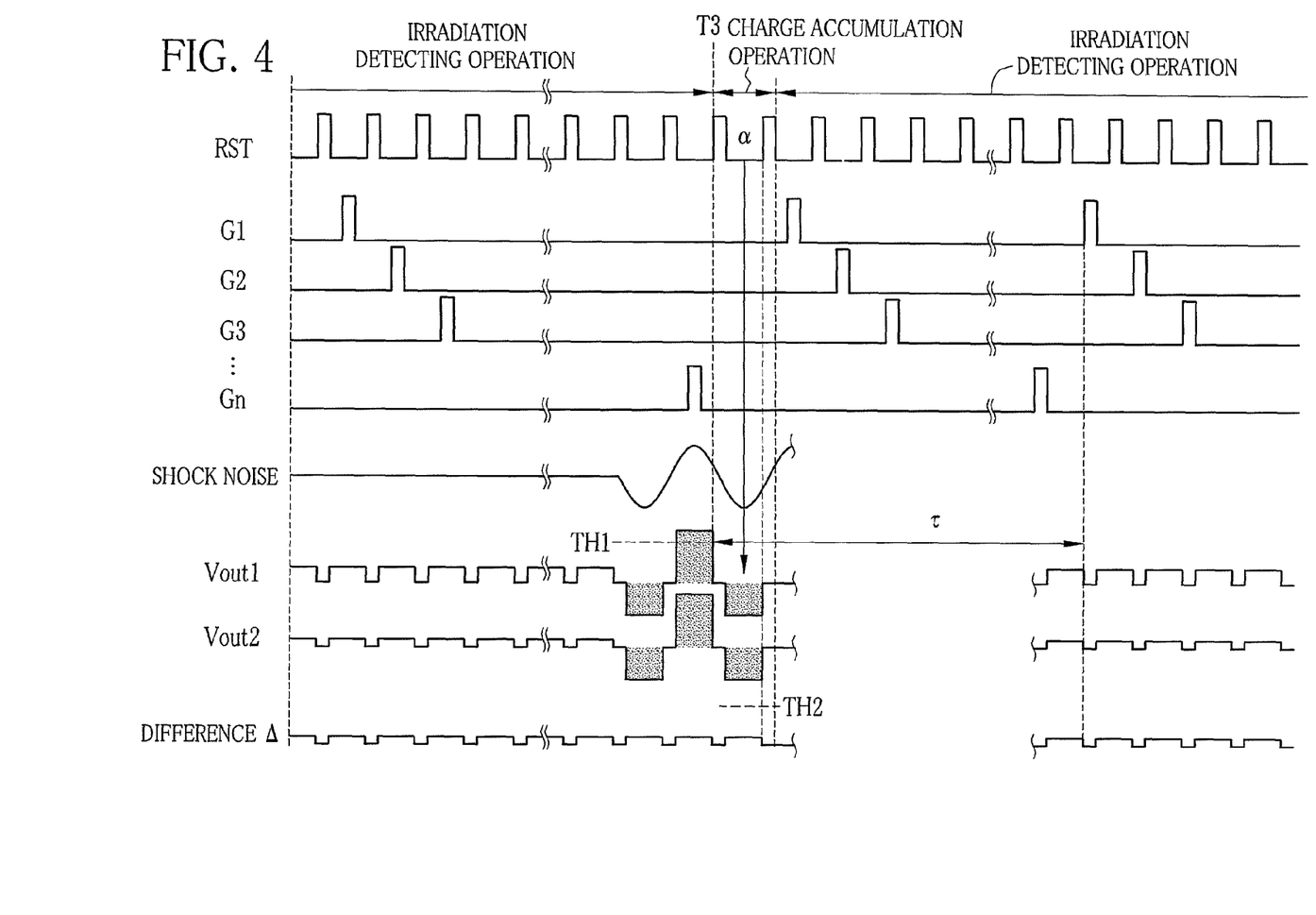
FIG. 4 is a timing chart in a case where shock noise occurs.

As shown in FIG. 4, when the shock noise occurs, the shock noise is added to the voltage signal Vout1. Since the threshold value TH1 is set larger than the dark charge noise, as described above, the voltage signal Vout1 representing only the dark charge noise does not reach the threshold value TH1. However, when the shock noise is added to the voltage signal Vout1, the voltage signal Vout1 reaches the threshold value TH1 without the presence of the X-ray irradiation. In FIG. 4, the voltage signal Vout1 exceeds the threshold value TH1 at a time T3.

The control section 54 detects the start of X-ray irradiation at the time T3, though the voltage signal Vout1 includes not a signal caused by the X-ray irradiation but a signal caused by the shock noise and the dark charge noise. This is because the control section 54 interprets the voltage signal Vout1 coming to be equal to or more than the threshold value TH1 as the start of X-ray irradiation. Upon the detection of the start of X-ray irradiation, the control section 54 turns off the TFTs 43 of all the pixels 37 to start the charge accumulation operation.

Since the voltage signal Vout1 represents an output value of the integration amplifier 66 connected to the short pixel 62, a waveform consisting of the shock noise and the dark charge noise is outputted as the voltage signal Vout1 after the start of the charge accumulation operation. On the other hand, the voltage signal Vout2 represents an output value of the integration amplifier 66 connected to the comparative pixel 63. Thus, when the charge accumulation operation is started and the TFT 43 of the comparative pixel 63 is turned off, the dark charge occurring in the comparative pixel 63 does not flow into the integration amplifier 66, and hence the voltage signal Vout2 does not have the dark charge noise. However, since the shock noise occurs in a circuit of the integration amplifier 66 and the like, the voltage signal Vout2 still has the shock noise, even if the TFT 43 of the comparative pixel 63 is turned off.

The control section 54 calculates the difference $\Delta$ between the voltage signals Vout1 and Vout2 in the first period $\alpha$ between the reset pulses RST after the time T3. A component of the shock noise is almost equal between the voltage signals Vout1 and Vout2. For this reason, in the charge accumulation operation started after the shock noise is wrongly detected as the start of X-ray irradiation, the difference $\Delta$ is of the order of the dark charge noise at most because of the cancellation of the shock noise. Therefore, the difference $\Delta$ does not reach the threshold value TH2 in the period $\alpha$. The control section 54 judges that the start of X-ray irradiation detected by itself is invalid, i.e. misdetection caused by the shock noise or the like.

When the detection at the time T3 is judged to be invalid, the control section 54 turns on the TFT 43 of every the pixel 37. Accordingly, the charge accumulation operation is aborted, and the irradiation detecting operation is restarted. At this time, the control section 54 begins detecting the start of X-ray irradiation after waiting for a lapse of predetermined time $\tau$ from the time T3 until the shock noise attenuates. Therefore, even after the misdetection caused by the shock noise, the FPD 25 smoothly shifts to the irradiation detecting operation, and continues the irradiation detecting operation until being actually irradiated with the X-rays. Note that, the predetermined time $\tau$ is regarded to be constant irrespective of a concrete state of the shock and the like, and hence is determined in advance.

The X-ray image captured by the electronic cassette 14 has defects in the short pixel 62 and the pixels 37 in the same column as that of the short pixel 62. To be more specific, the short pixel 62 does not accumulate the signal charge, in contrast to the other pixels 37, and the signal charge generated in the short pixel 62 is constantly readout to the signal line 48. Thus, data readout from the short pixel 62 in the readout operation contains only a noise component caused by the dark charge, instead of information of the sample. Also, the signal charge read out from the pixel 37 connected to the signal line 48 common to that of the short pixel 62 contains the dark charge flowing from the short pixel 62. Thus, the signal charge read out from the pixels 37 in the same column as that of the short pixel 62 always has more dark charge noise than that of the pixels 37 in the other columns without having the short pixel 62. As described above, the short pixel 62 and the pixels 37 in the same column as that of the short pixel 62 have characteristics different from that of the other pixels 37. Therefore, in the console 21, the correction section 31 corrects the X-ray image data received from the electronic cassette 14 by interpolation and the like, and outputs the corrected data to the monitor 22.

Note that, in the above first embodiment, the two threshold values TH1 and TH2 are different from each other. The threshold value TH1 is used for detecting the start of X-ray irradiation, and the threshold value TH2 is used for judging the validity of the detection. However, the two threshold values TH1 and TH2 may take the same value.

In the first embodiment, the second threshold value TH2 is set larger than the threshold value TH1, but may be smaller than the threshold value TH1. However, the threshold value TH1 is preferably as small as possible. This is because the smaller the threshold value TH1, the more quickly the start of X-ray irradiation is detectable, and the less X-rays the patient H gets exposed to until the start of X-ray irradiation is detected. The threshold value TH2, on the other hand, is preferably as large as possible. This is because the threshold value TH2 is used for checking the validity of the detection, and the difference Δ is larger than the amplitude of the shock noise if the detection is valid. Thus, taking a large value (for example, value larger than the threshold value TH1) as the threshold value TH2 makes it possible to improve accuracy in the judgment as to whether or not the detection of the start of X-ray irradiation is valid.

Note that, in the above first embodiment, the judgment is performed in the period α between the first and second reset pulses RST. The judgment, however, may be performed in another period at least within a duration in time τ until the shock noise attenuates. Even after a lapse of time τ, which is taken before the shock noise attenuates, the validity of the detection can be judged appropriately. In this case, however, the irradiation detecting operation is suspended too long time if the detection is judged to be invalid. For this reason, the judgment of the validity is preferably carried out as soon as possible after the FPD 25 shifts to the charge accumulation operation, as in the case of the above embodiment.

Furthermore, in the first embodiment, the judgment of the validity is performed in the period α between the first and second reset pulses RST after the electronic cassette 14 shifts to the charge accumulation operation. However, the judgment may be performed a plural number of times, including the judgment performed in the period α. For example, the judgment may be performed a plural number of times in a first period α, a second period α, a third period α, . . . , and the detection may be judged to be valid when the difference Δ comes to be equal to or more than the threshold value TH2 for a predetermined number of times.

Figure 5:
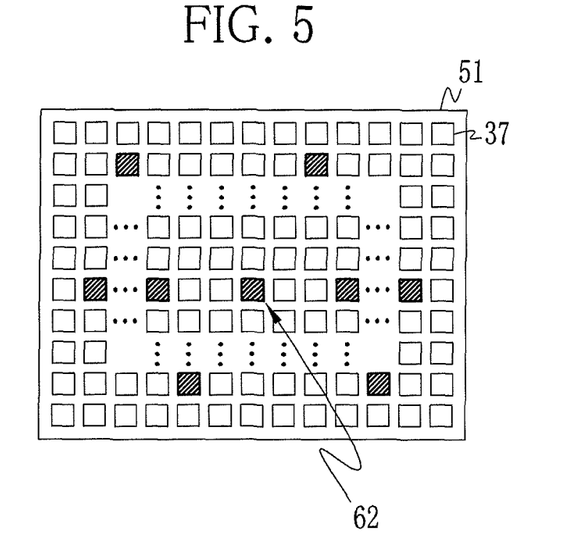
FIG. 5 is a schematic plan view of a TFT having plural short pixels.

The single short pixel 62 is provided in the first embodiment, but, as shown in FIG. 5, plural short pixels 62 are preferably provided in the imaging area 51. Even if the plural short pixels 62 are provided, the single comparative pixel 63 is enough. In this case, the judgment of the validity is performed on a short pixel 62 basis based on the output value of the signal line 48 connected to the short pixel 62, and the same number of judgment results as the number of the short pixels 62 are yielded. When a predetermined number or more of the judgment results say that the detection is valid, the detection is judged to be valid, for example.

As described above, the provision of the plural short pixels 62 prevents a failure in the detection, when the body part to be imaged contains a portion that hardly passes the X-rays, and some short pixels 62 covered with that portion cannot receive a sufficient amount of X-rays. Also, the provision of the plural short pixels 62 can improve accuracy in detecting the start of X-ray irradiation and in judging the validity of the detection.

Figure 6:
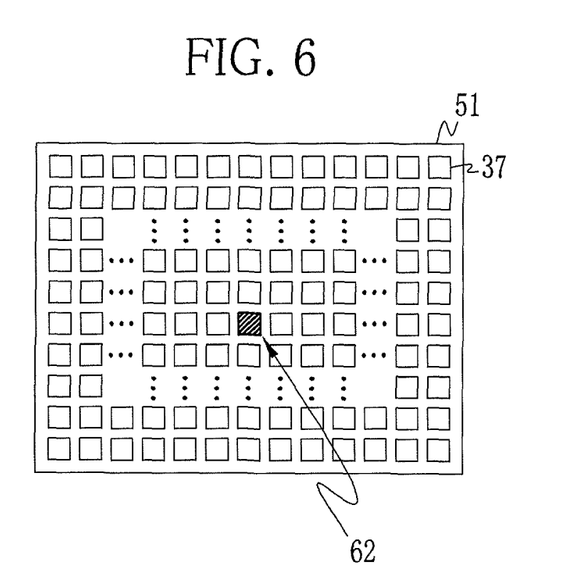
FIG. 6 is a schematic plan view of the TFT having the short pixel laid out in the middle of an imaging area.

As shown in FIGS. 5 and 6, at least one short pixel 62 is preferably disposed in the middle of the imaging area 51. This facilitates detecting the start of X-ray irradiation with high accuracy, even if the center of the imaging area 51 is misaligned with the center of the irradiation field or the center of the body part to be imaged.

In the first embodiment, the short pixel 62 and the comparative pixel 63 are situated in the same row and in the adjoining columns to each other. However, the short pixel 62 and the comparative pixel 63 may be situated in the same row across one or more other pixels 37 therebetween, or may be situated in the different rows. However, the short pixel 62 and the comparative pixel 63 are preferably situated as near as possible, so the X-rays incident upon the short pixel 62 and the comparative pixel 63 have similar conditions and the like.

As described above, the control section 54 carries out the judgment of the validity based on the difference Δ between the voltage signals Vout1 and Vout2. Accordingly, if the short pixel 62 and the comparative pixel 63 are situated in the same column (connected to the same signal line 48), the voltage signals Vout1 and Vout2 are identical, and the judgment of the validity is made inappropriately. Thus, the short pixel 62 and the comparative pixel 63 are necessarily situated in the different columns.

Second Embodiment

In the above first embodiment, when the voltage signal Vout1 is increased to be equal to or more than the threshold value TH1, the increase in the voltage signal Vout1 is detected as the start of X-ray irradiation, irrespective of whether the increase is actually caused by the X-ray irradiation or caused by the shock noise. After the detection, the validity of the detection is judged. Instead of this, the shock noise may not be detected, while only the X-ray irradiation may be reliably detected. A second embodiment in which only the actual X-ray irradiation is reliably detected will be hereinafter described. In this case, the structure of an X-ray imaging system is the same as that of the X-ray imaging system 10 of the first embodiment, so the description thereof will be omitted. Also, the operation same as that of the first embodiment will be omitted.

Figure 7:
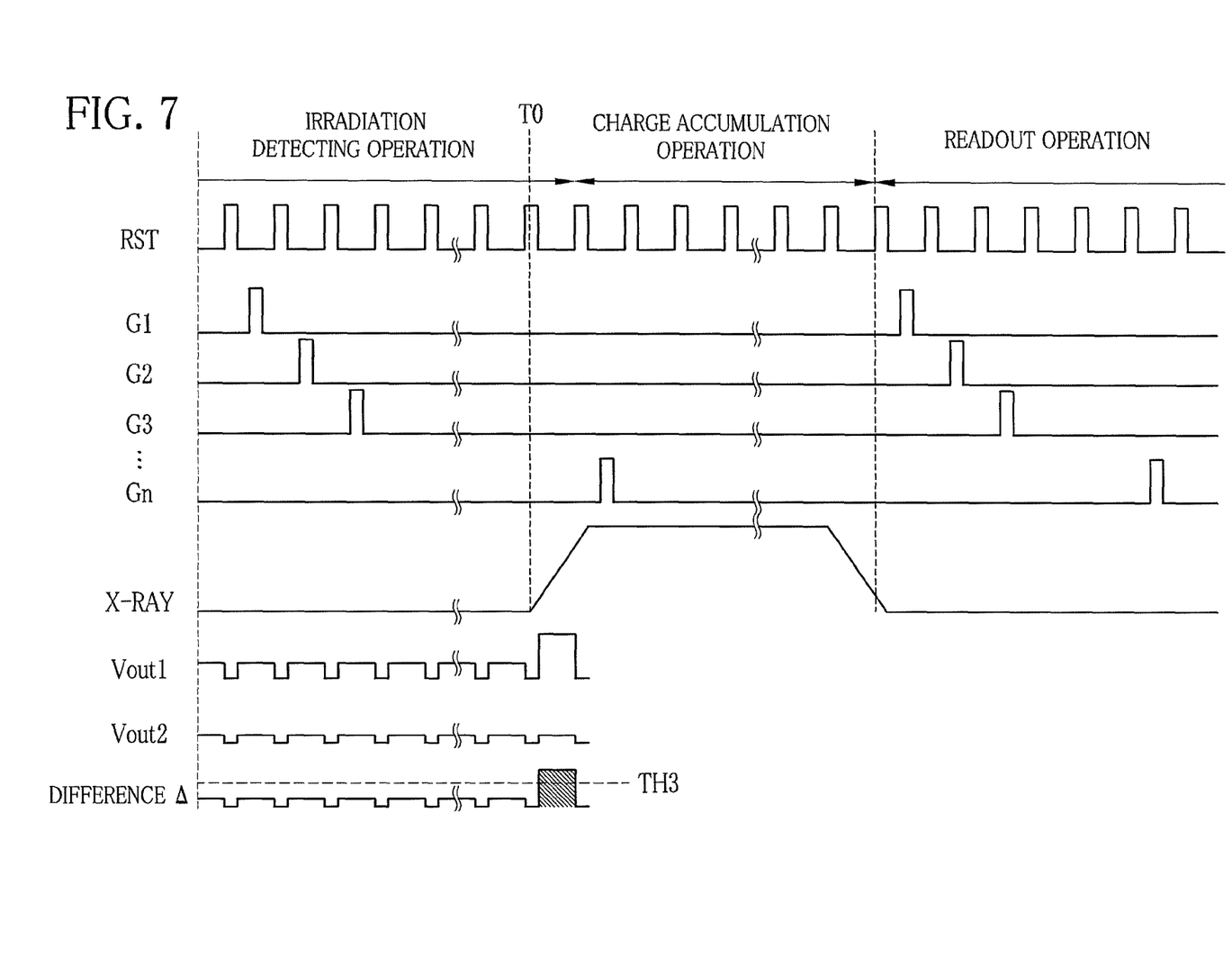
FIG. 7 is a timing chart during the X-ray imaging operation by an X-ray imaging system of a second embodiment.

As shown in FIG. 7, when the irradiation detecting operation is started, the control section 54 obtains the voltage signal Vout1 from the column having the short pixel 62. At the same time, in a state where the TFTs 43 of the comparative pixel 63 and the pixels 37 in the same column are turned off, the voltage signal Vout2 is obtained from the column having the comparative pixel 63 in synchronization with reset timing. Then, the control section 54 calculates the difference Δ between the voltage signals Vout1 and Vout2, and compares the difference Δ with a threshold value TH3.

When the X-rays are incident on the pixels, the signal charge generated in the short pixel 62 flows into the integration amplifier 66, so the voltage signal Vout1 exceeds a noise level and reaches a predetermined signal level S in accordance with the amount of the X-rays incident thereon. On the other hand, the comparative pixel 63 generates the signal charge by an amount corresponding to the amount of the incident X-rays, and accumulates the signal charge in its capacitor because the TFT 43 is turned off. Thus, the signal charge does not flow into the integration amplifier 66. Accordingly, the voltage signal Vout2 is almost zero, and the outputted signal value is in the noise level. Therefore, when the X-rays are incident, the difference Δ is substantially equal to the signal level S generated in the short pixel 62, and exceeds the threshold value TH3. The control section 54 detects a time when the difference Δ comes to be equal to or more than the threshold value TH3 as the start of X-ray irradiation, and begins the charge accumulation operation.

Figure 8:
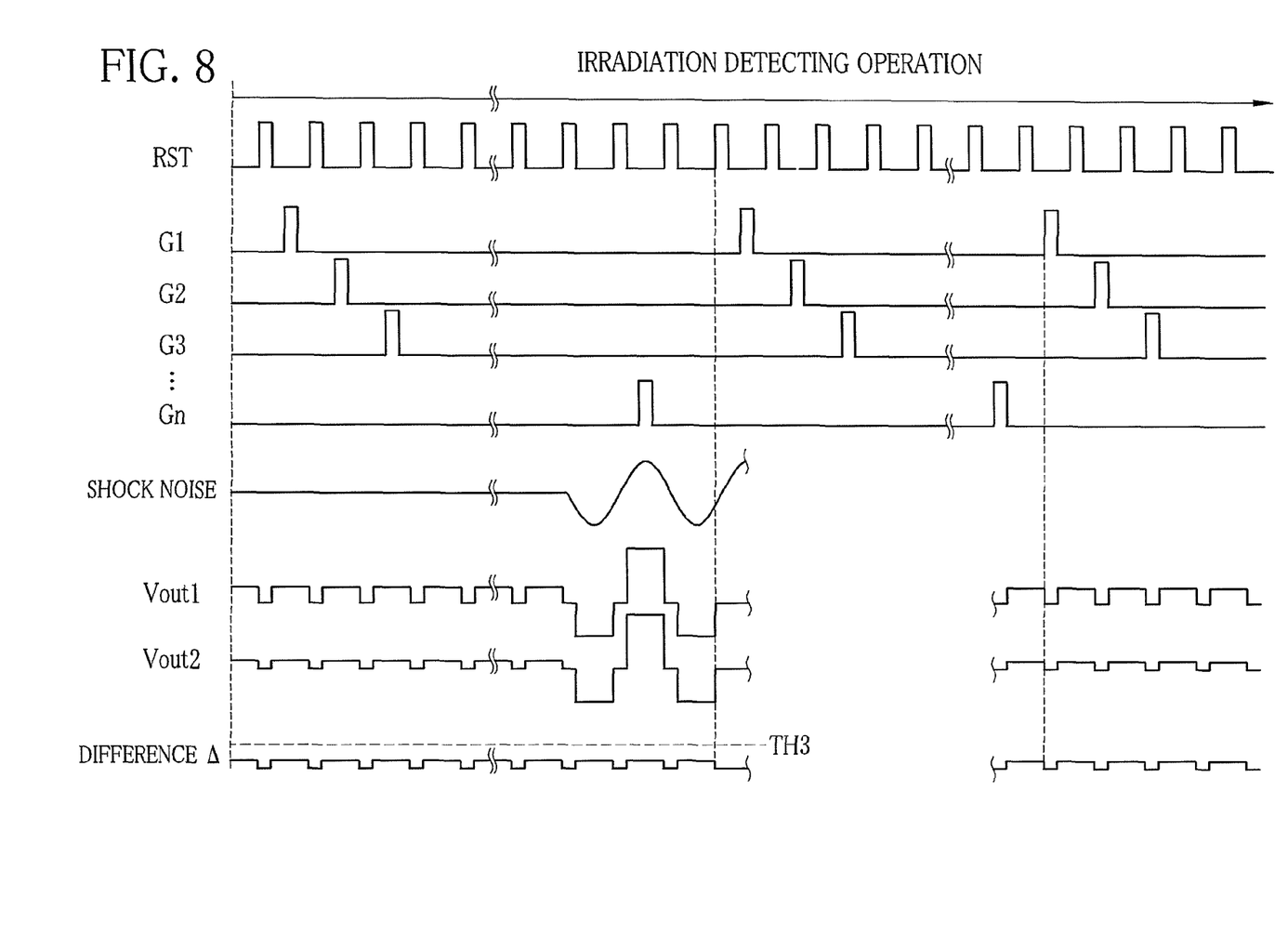
FIG. 8 is a timing chart in a case where the shock noise occurs in the X-ray imaging system of the second embodiment.

On the other hand, as shown in FIG. 8, the shock noise is almost equally added to the voltage signals Vout1 and Vout2. Thus, when the shock noise occurs, the difference Δ is of the order of the dark charge noise occurring in the short pixel 63, in other words, is substantially zero at all times. The control section 54 continues comparing the difference Δ with the threshold value TH3 in the irradiation detecting operation, but does not detect the start of X-ray irradiation because the difference Δ is always zero even if the shock noise occurs. Accordingly, the shock noise does not cause the FPD 25 to shift to the charge accumulation operation.

As described above, since the start of X-ray irradiation is detected by comparing the difference Δ with the threshold value TH3, the shock noise does not cause the misdetection of the start of X-ray irradiation, and precisely detect the start of actual X-ray irradiation. In this case, in contrast to the above first embodiment, by eliminating the need for judging the validity after the detection, it is possible to detect the start of actual X-ray irradiation quickly and precisely.

In the above second embodiment in which only one short pixel 62 is provided in the single column, the voltage signal Vout2 is obtained in a state where the TFTs 43 of all the pixels in the column of the comparative pixel 63 are turned off. However, when the plural short pixels 62 are provided in the single column, the voltage signal Vout2 may be read out in a state where the TFTs 43 in the row of the comparative pixel 63 are turned on without reference to the reset timing.

In this case, when the X-rays are incident, the voltage signal Vout1 contains the signal charge generated in the plural (N number of) short pixels 62 and the signal charge generated in the pixel that has the TFT 43 of being turned on synchronously with the reset timing. In other words, the voltage signal Vout1 takes a signal value of (N+1) S, multiplying by N+1 a signal value S of the signal charge generated in one pixel. On the other hand, the voltage signal Vout2 contains the signal charge generated in the comparative pixel 63 that has the TFT 43 of being turned on synchronously with the reset timing. The voltage signal Vout2 takes a signal value of S, equal to the signal value generated in one pixel. Accordingly, when the X-rays are incident, the difference Δ is substantially (N+1)S−S=NS, not zero. The difference Δ is equal to or more than the threshold value TH3, so the control section 54 detects the start of X-ray irradiation. When the shock noise occurs, on the contrary, both the voltage signals Vout1 and Vout2 are substantially equal to a signal value of the shock noise. Thus, the difference Δ takes a value of the order of multiplying the dark charge noise by N. The difference Δ is almost equal to zero, and does not exceed the threshold value TH3. Therefore, in the case of the shock noise, the control section 54 does not detect the start of X-ray irradiation.

In the above first and second embodiments, the correction section 31, which corrects the pixel values of the short pixel 62 and the pixels 37 connected to the same signal line 48 as that of the short pixel 62, is provided in the console 21, but may be provided in the electronic cassette 14.

In the above first and second embodiments, the reset operation is performed during the irradiation detecting operation by the sequential reset method, but is not limited to it. During the irradiation detecting operation, the TFTs 43 of the all the pixels 37 may be turned on. In this case, every pixel 37 is always maintained in a reset state during the irradiation detecting operation, so it is possible to prevent the occurrence of offset noise if the electronic cassette shifts to the charge accumulation operation concurrently with the detection of the start of X-ray irradiation. In a case where the TFTs 43 of all the pixels 37 are not turned on during the irradiation detecting operation, as in the case of the above embodiments, if long time has elapsed after the start of irradiation detecting operation, the dark charge can be accumulated in the pixels 37 by such an amount as to affect image quality. Therefore, after the detection of the start of X-ray irradiation, every pixel 37 is preferably reset at the beginning of the charge accumulation operation.

In the above first and second embodiments, the pixels 37 are sequentially reset from row to row in the waiting mode, but all the pixels 37 may be concurrently reset. In the above embodiment, the sequential reset of the pixels 37 is repeated in the waiting mode. However, the pixels 37 may be reset at arbitrary timing and frequency, and at least immediately before the shift to the irradiation detecting operation, for example, so long as there is no influence on the irradiation detecting operation. By way of example of the influence, there is a case where as soon as the TFT 43 of every pixel 37 is turned on upon the shift to the irradiation detecting operation, the voltage signal Vout1 (and Vout2) exceeds the threshold value TH1, and the FPD 26 shifts to the charge accumulation operation without the X-ray irradiation or the shock noise.

In the above first and second embodiments, a panel of the indirect conversion type is used as the FPD 25, but a panel of a direct conversion type, which directly converts the X-rays into the electric signal, may be used instead.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A radiation image detecting device for imaging a sample irradiated with radiation from a radiation source to obtain a radiographic image, comprising:

a plurality of pixels arranged in two dimensions along row and column directions in an imaging area, each for generating signal charge in accordance with an amount of said radiation incident on said pixel, said pixels including at least one short pixel without having a switching element for readout control of said signal charge and normal pixels having said switching element;

a plurality of scan lines extending in said row direction, a gate electrode of said switching element of every normal pixel being connected to said scan line of said corresponding row;

a plurality of signal lines extending in said column direction, every normal pixel being connected to said signal line of said corresponding column through a medium of said switching element, and said short pixel being directly connected to said signal line of said corresponding column;

a drive section for selecting one of said scan lines, and putting said normal pixels connected to said selected scan line into charge accumulation operation and readout operation, said switching element being turned off in said charge accumulation operation to accumulate said signal charge generated in said normal pixel, said switching element being turned on in said readout operation to discharge said accumulated signal charge through said corresponding signal line; and a control section for judging a start of irradiation with said radiation and controlling said drive section, said start of said irradiation being judged based on a difference between first and second output values, said first output value being outputted from a first signal line connected to said short pixel out of said signal lines, said second output value being outputted from a second signal line connected to said normal pixel.

2. The radiation image detecting device according to claim 1, wherein said control section compares said difference between said first and second output values with a predetermined threshold value, and starts said charge accumulation operation through said drive section when said difference is equal to or more than said threshold value.

3. The radiation image detecting device according to claim 1, wherein said control section makes a first judgment by which said start of said irradiation is detected based on said first output value, and provisionally starts said charge accumulation operation through said drive section, and thereafter makes a second judgment by which a validity of said first judgment is judged based on said difference between said first and second output values in order to determine whether said charge accumulation operation is aborted or continued.

4. The radiation image detecting device according to claim 3, further comprising:

a first integration amplifier connected to said first signal line, for outputting as said first output value a voltage corresponding to an integrated value of said signal charge generated in said short pixel; and a second integration amplifier connected to said second signal line, for outputting as said second output value a voltage corresponding to an integrated value of said signal charge accumulated in said normal pixel.

5. The radiation image detecting device according to claim 4, wherein after said charge accumulation operation is started, said first and second integration amplifiers are reset repeatedly at predetermined intervals, and said second judgment is carried out in a period between first and second reset operations.

6. The radiation image detecting device according to claim 3, wherein while said start of said irradiation is detected, said control section turns on all said switching elements through said drive section.

7. The radiation image detecting device according to claim 1, wherein said short pixel is situated in a middle of said imaging area.

8. The radiation image detecting device according to claim 7, wherein said short pixels are situated in various positions in said imaging area.

9. The radiation image detecting device according to claim 1, further comprising:

a correction section for correcting a pixel value of said short pixel and pixel values from said column having said short pixel contained in said obtained radiographic image.

10. A method for detecting a start of irradiation of a radiation image detecting device with radiation, said radiation image detecting device including at least one short pixel without having a switching element and plural normal pixels having said switching element, said method comprising the steps of:

subtracting a second output value outputted from a comparative pixel being one of said normal pixels from a first output value outputted from said short pixel; and judging that said irradiation is started when a difference between said first and second output values is equal to or more than a predetermined value.

11. The method according to claim 10, wherein said comparative pixel is adjoining to said short pixel.

* * * * *